United States Patent [19]

Harris

[11] 4,433,086

[45] Feb. 21, 1984

[54] HEAT STABILIZED POLYMERS

[75] Inventor: Alva F. Harris, Wilbraham, Mass.

[73] Assignee: Monsanto Company, St. Louis, Mo.

[21] Appl. No.: 332,054

[22] Filed: Dec. 18, 1981

[51] Int. Cl.$^3$ .............................................. C08K 5/09
[52] U.S. Cl. .................................... 524/112; 524/288
[58] Field of Search ...................... 524/112, 288, 384; 525/350, 329; 264/331.16

[56] References Cited

U.S. PATENT DOCUMENTS

| | | | |
|---|---|---|---|
| 2,439,227 | 4/1948 | Seymour et al. | 525/285 |
| 3,793,401 | 2/1974 | Nield et al. | 524/112 |
| 3,794,616 | 2/1974 | Dennis et al. | 260/45.7 P |
| 3,954,913 | 5/1976 | Uebele et al. | 524/112 |
| 4,089,912 | 5/1978 | Levek et al. | 524/112 |
| 4,151,151 | 4/1979 | Isley | 524/112 |
| 4,165,309 | 8/1979 | Fielding | 524/112 |
| 4,173,561 | 11/1979 | Tabana et al. | 524/112 |
| 4,262,096 | 4/1981 | Lee et al. | 525/285 |
| 4,292,228 | 9/1981 | Isley | 524/112 |

OTHER PUBLICATIONS

L. Mascia "The Role of Additives in Plastics" pp. 16–19, 30–37 and 40–43, 1974, John Wiley & Sons, N.Y.C.

Grassie et al., "Thermal Discoloration of Nitrile Polymers", High Temperature Resistance and Thermal Degradation of Polymers–S.C.I. Monograph, No. 13, pp. 184–199 (1961)–Society of Chemical Industry, London.

Primary Examiner—Veronica P. Hoke
Attorney, Agent, or Firm—W. J. Farrington; P. D. Matukaitis; A. H. Cole

[57] ABSTRACT

The tendency of high temperatures to decompose polymer compositions comprising polymer units derived from maleic anhydride is controlled by the use of a tetrahalogenated aromatic dicarboxylic acid or anhydride thereof.

7 Claims, No Drawings

HEAT STABILIZED POLYMERS

BACKGROUND OF THE INVENTION

This invention relates to polymers and polyblends, comprising, as polymerized components, an unsaturated dicarboxylic acid anhydride. More specifically, it relates to such polymers and polyblends that have been stabilized against certain effects of high temperatures.

It has been found that polymers containing polymerized maleic anhydride have a tendency to decompose at elevated temperatures. It is believed that this occurs by a rupture of the polymer chain at a maleic anhydride segment with consequent evolution of carbon dioxide. In a molded item this can result in unsightly splaying and blistering of the surface of the molded item. The effect increases with the anhydride content.

It has further been found that when maleic anhydride and acylonitrile are present in the same polymeric environment, there is an apparent tendency for a reaction to occur that results in crosslinking and sometimes the evolution of carbon dioxide and/or water. This reaction occurs at elevated temperatures of the kind that can be reached during extrusion and molding operations. It would appear that the crosslinking occurs whether the acrylonitrile and maleic anhydride components are in the same or different polymer molecules.

The effect increases in significance with the amounts of the components and generally above about 15% of each component in a polymer composition is enough to generate the effect to a noticeable extent if the temperature is sufficiently elevated, that is above about 265° C.

While it is usually possible to extrude and mold at lower temperatures where no problem is encountered, it is desirable to provide accommodation for the wide variation of conditions that occur as a matter of course in a commerical operation. The present invention provides a means of reducing the significance of the crosslinking effect thus permitting the use of a wider range of molding and extrusion conditions with such polymers.

DISCUSSION OF THE PRIOR ART

The crosslinking effect referred to above has been identified, for example, in U.S. Pat. No. 4,223,096 which describes the preparation of rubber modified terpolymers of styrene, maleic anhydride and acrylonitrile. In that patent, the crosslinking tendency is controlled by the use of chain transfer agents such that up to about 20% acrylonitrile can be incorporated in a polymer containing from 15% to 30% of maleic anhydride before the crossling tendency renders the polymer non-thermoformable.

Other polymers in which such a tendency might be encountered in at least part of the ranges described include those described in U.S. Pat. Nos. 3,642,949; 4,141,934; 4,167,543; 4,197,263; 4,197,376 and 4,205,140.

The decomposition at elevated temperatures of polymers of styrene and maleic anhydride is described in U.S. Pat. No. 3,794,616 which teaches that control can be obtained using acids of phorphous, sulfur, silicon or boron.

The present invention provides a means of controlling these tendencies and makes it possible either to extend the composition range so as to achieve even more advantageous properties, or to broaden the range of permissible processing conditions for the polymers.

DESCRIPTION OF THE INVENTION

The present invention provides a polymer composition with increased stability comprising polymer units derived from a vinylaromatic monomer and an unsaturated dicarboxylic acid anhydride, which composition comprises from 0.1 to 8% by weight based on the composition weight of an tetrahalogenated aromatic dicarboxylic acid or anhydride of such an acid.

The polymeric composition can be provided by a single polymer or it may be a blend of polymers. Thus, the polymeric composition can be, for example, a styrene/maleic anhydride copolymer, a styrene/maleic anhydride/acrylonitrile terpolymer (or the rubber-modified equivalent of either) or a blend of a styrene/maleic anhydride copolymer (or its rubber-modified equivalent) with a styrene/acrylonitrile copolymer or an acrylonitrile/butadiene/styrene (ABS) copolymer or a nitrile rubber.

The decomposition effect is usually not a significant factor unless the maleic anhydride content of a polymer formulation is greater than about 5% by weight. In general, the invention has greatest utility in inhibiting decomposition when the anhydride content of the polymer formulation is from 10 to 35% by weight.

In general, the crosslinking effect begins even where the proportions of the nitrile and anhydride components are quite low but as might be expected, the significance of the effect increases proportionately with the amounts. Thus, the present invention has particular utility when the proportions of the nitrile and anhydride components are each above about 5% by weight of the composition weight. The process of the invention is particularly useful when the proportion of anhydride in the composition is between about 5 and 30% and the nitrile proportion is between about 5 and 20% of the total polymer composition.

The tetrahalogenated aromatic dicarboxylic acid or anhydride derivative is preferably a benzene ring bearing four halogen atoms which are preferably chlorine or bromine. Where the additive is expected to confer flame retardant characteristics however the preferred halogen is bromine. Typical examples include tetrachlorophthalic anhydride (TCPA); and tetrabromophthalic anhydride (TBPA); and compounds with mixed halogen substituents.

The anhydride form is preferred. It is believed that, in use, the acid is dehydrated to the anhydride form at the temperature at which the base polymer is extruded and thermoformed. Since water is thereby evolved and can cause molding problems, the anhydride form is preferably used.

The amount of the halogenated dicarboxylic acid or anhydride derivative depends largely on the degree of inhibition that is necessary or desirable for the composition or application involved. Usually, however, from 0.25 to 5% and preferably 0.5 to 2% by weight based on the composition weight is found to be adequate.

The composition can, of course, comprise other additives such as antioxidants, fire retardants, plasticizers, fillers of various types, pigments, anti-static additives stabilizers and the like. It is also useful to employ a chain transfer agent since this also tends to limit crosslinking. Certain chain transfer agents are particularly useful in the practice of this invention since they appear to show an enhanced activity. Such agents include terpinolene and gamma-terpinene. Other chain transfer agents that can be used include fluorene; indene; cyclo-1,4-hexadiene; 1,4,5,8-tetrahydronaphthalene; α-methyl styrene dimers; tert and n-dodecyl mercaptans; iso-octyl thioglycollate; 2-mercaptobenzothiazole; carbon tetrachloride; and bromotrichloromethane.

It should be noted that the halogenated organic dicarboxylic acid or anhydride derivative, because of its halogen content can also function as an effective flame retardant. If such a function is desired, the amount to be added is of course much greater than would otherwise be the case, perhaps up as high as 20% of the total polymer composition weight. In such applications, it is desirable to have bromine as the halogen substituent.

The polymer composition whose processability is improved by the use of the tetrahalogenated acid or anhydride compounds can be single polymers such as a styrene/maleic anhydride copolymer or a terpolymer of styrene, maleic anhydride and acrylonitrile or a rubber-modified version of either such as are described, for example, (respectively) in U.S. Pat. Nos. 3,919,354 and 4,262,096. The invention is particularly useful with terpolymers which comprise from 15 to 30% by weight of maleic anhydride and from 5 to 20% by weight of acrylonitrile, particularly when these are rubber-modified terpolymers containing a rubber having a glass transition temperature below 0° C. and preferably below −30° C. Suitable rubbers include polybutadiene, a rubbery copolymer of styrene or acrylonitrile and butadiene, polyisoprene, polychloroprene, EPDM rubbers, ethylene/vinyl acetate rubbers, acrylate rubbers and polypentanamer.

The compositions of the invention are also useful when containing no unsaturated nitrile. Thus, the polymer composition can comprise an anhydride-containing polymer such as a styrene/maleic anhydride copolymer preferably one containing at least 10% by weight, and more preferably one containing at least 20%, such as from 20 to 35% by weight, of maleic anhydride, or a terpolymer with part of the styrene replaced by a nonnitrile copolymerizable monomer such as an acrylate or methacrylate ester so as to provide from 2 to 20% of the copolymer weight. The anhydride-containing polymer can, of course, be rubber-modified. With such compositions control of the decomposition reaction is achieved.

Where a nitrile containing component is also present and in addition the problem of crosslinking is also encountered, the nitrile-containing component can be provided by polymers such as styrene/acrylonitrile comprising from 20 to 70% by weight of acrylonitrile and acrylonitrile/butadiene/styrene (ABS) wherein the acrylonitrile content is preferably at least 10% and more preferably at least 30% of the ABS polymer weight.

The above exemplification of the preferred polymers is in terms of styrene, maleic anhydride and acrylonitrile but it is understood that some or all of these monomers can be replaced by their well known homologues such as α-methyl styrene, p-methylstyrene and chlorostyrene (for styrene); itaconic anhydride, aconitic anhydride and citraconic anhydride (for maleic anhydride); and methacrylonitrile (for acrylonitrile).

DESCRIPTION OF THE PREFERRED EMBODIMENTS

To illustrate the invention further a number of tetrahalogenated organic dicarboxylic acid anhydrides were blended with a polyblend comprising 37% by weight of a styrene/maleic anhydride/methyl methacrylate terpolymer (S/MA/MM) comprising about 25.5% by weight of maleic anhydride and 63% of either (a) an SAN copolymer comprising 33% of acrylonitrile; or (b) an ABS (SAN grafted polybutadiene particles dispersed in a matrix of an SAN copolymer) comprising about 17.8% by weight of acrylonitrile. The terpolymer used included 0.3% of an alkylated phenol antioxidant available from Ethyl Corp. under the trade name Ethanox 330. The ABS and SAN components both included 0.1% of an alkylated phenol antioxidant available from Shell under the trade name Ionol and the ABS additionally incorporated 0.3% of tris(phenyl) phosphite (Naugard P manufactured by Uniroyal Corp).

Except where otherwise indicated the terpolymer and ABS or SAN were blended together with a plasticizer (where one was used), and with the tetrahalogenated organic dicarboxylic derivative. The blend was dried at 80° C. in a circulating air oven and extruded in a one inch vented Killion extruder. Extruding temperatures at about 200° C. were used.

Pellets of the blend were vacuum dried 16 hours at 80° C. and molded in a one ounce Arburg molding machine using 800 psi pressure. Izod bars (1.27 cm × 1.27 cm × 12.7 cm) were molded directly from the Arburg at a stock temperature of 282° C., and also after "Dwell Times"(i.e. length of time in Arburg) at stock temperature of 5, 10 and 15 minutes. At each time, three bars were molded and inspected closely to determine the extent of any blistering (indicating decomposition) that had occurred. The bars were then ground in a Thomas mill. The ground bars were vacuum dried 16 hours at 80° C. and used to measure apparent viscosity using an automatic capillary rheometer. Four pressures and four flow times were used to measure apparent viscosities. The apparent viscosity was calculated from this data using the technique described in "Automatic Capillary Rheometer, Instruction Manual for Model 3501-H" published by Monsanto Research Corp., (April 1972 Edition). The apparent viscosity used in each case is the value at $100 \text{ sec}^{-1}$ and a rheometer set temperature of 246° C. The change in apparent viscosity gives an excellent indication of the changes that occur after exposure to the elevated temperatures.

The maleic anhydride content was determined by dissolving 0.3 g of polymer in 50 ml. of pyridine, adding 1 ml. of water, allowing the mixture to stand at room temperature for three days and then titrating with N/10 methanolic sodium hydroxide using a thymol blue indicator, (0.5% in a 1/1 mixture of pyridine and methylcellosolve).

Solution of the samples in tetrahydrofuran and pyridine were observed for signs of gel.

EXAMPLE 1

This Example shows the performance of a polyblend consisting of 37 parts of the S/MA/MM terpolymer and 63 parts of SAN that contains no stabilizer additive. It serves as a basis of comparison for Examples 2, 3 and 4.

The results are set forth in Table 1 below. It should be noted that the maleic anhydride content of the composition was 9.6% by weight and that of acrylonitrile was 20.5% by weight.

TABLE 1

| Sample | Appearance | Viscosity (Kp) | % MA | Gel |
|---|---|---|---|---|
| Blend | | | 9.6 | None |

TABLE 1-continued

| Sample | Appearance | Viscosity (Kp) | % MA | Gel |
|---|---|---|---|---|
| (calculated) Molded Samples | | | | |
| None[1] | Good surface Many small internal bubbles | 16.0 | 7.8 | None |
| 5 mins. | Frosted surface due to profuse gas evolution | 31 | 7.8 | Present |
| 10 mins. | As for 5 min. | — | — | Present |

[1] i.e. On cycle molding-no delay in the machine held at molding temperature.

EXAMPLE 2

Example 1 was repeated except that 2% by weight of TCPA (tetrachlorophthalic anhydride) was pre-extruded with the SAN prior to the blending with the S/MA/MM. The TCPA content of the blend was therefore 1.26% by weight.

The greater ease of molding made it possible to obtain samples after up to 25 minutes residence at stock temperature. The results are shown in Table 2.

TABLE 2

| Sample | Appearance | Viscosity (Kp) | % MA | Gel |
|---|---|---|---|---|
| Blend (calculated) Molded Samples Dwell Time | | | 9.0 | — |
| None | Good surface Some internal bubbles Yellow-Orange color | 11.4 | — | — |
| 5 mins. | Good surface More internal bubbles Brown color developing | 12.2 | 8.8 | None |
| 10 mins. | As for 5 mins. and more brown color | 14.2 | 8.5 | None |
| 15 mins. | As for 10 mins. and brown color, more | 14.9 | 8.5 | None |
| 20 mins. | As for 15 mins. More brown color | 14.9 | 8.1 | None |
| 25 mins. | As for 20 mins. More brown color | 15.6 | 8.0 | None |

From Table 2 it can be seen that the TCPA effectively eliminated gel formation and the reduction in maleic anhydride content was significantly slowed indicating good control over decomposition. There was a small increase in viscosity but nothing like so great as was observed in the absence of TCPA indicating that a substantial degree of control over crosslinking had been established.

There was also a very significant reduction in the initial melt viscosity indicating easier molding.

When the same experiment was run with phthalic anhydride substituted for TCPA, the viscosity of the 5 mins. sample was 36.9 Kp and there was much crazing of the samples which had begun to turn brown. The MA level was down to 8.0% and gel was observed after 10 minutes when the viscosity was 56.4 Kp.

EXAMPLE 3

This Example repeats Example 1 except that the S/AN was blended with 1% by weight of TCPA before being blended with the S/MA/MM. Thus, the final TCPA was 0.63% by weight. The results obtained are set forth in Table 3 below.

TABLE 3

| Sample | Appearance | Viscosity (Kp) | Gel |
|---|---|---|---|
| Pellet (extruded) Molded Samples Dwell Time | | 10.6 | None |
| None | See Ex. #2 | 11.1 | None |
| 5 mins. | | 12.3 | None |
| 15 mins. | | 15.0 | None |
| 25 mins. | | 19.3 | None |
| 35 mins. | Blistered surface Bar bulged from internal gas pressure Very brown color. | — | Present |

The data in the above Table illustrates that the advantages in Example 2 are reproduced even when the amount of TCPA present is halved.

EXAMPLE 4

This Example reproduces Example 1 except that 0.5% of TCPA was blended with S/AN. Thus, the amount of TCPA in the final blend is 0.316%. The results obtained are set forth in Table 4 below.

TABLE 4

| Sample | Viscosity (Kp) |
|---|---|
| Extruded Pellet Molded Samples Dwell Time | 9.3 |
| None | 13.3 |
| 25 mins. | 25.5 |

The above data shows that even with a very small amount of TCPA, a significant improvement in viscosity control over the unmodified formulation is obtained.

EXAMPLE 5

This Example is a re-run of Example 1 using as the polymer material a blend of S/MA/MM with ABS. It serves as a basis for comparison for Examples 6 and 7.

A blend of 37% of S/MA/MM, 63% of ABS, and 0.3% parts of Ethanox 330 and 0.3% of Naugard P, (all percentages are given by weight) were doubled pass extruded at 218° C. It should be noted that the weight percentage of maleic anhydride in the blend was 9.6%, and the total weight percentage of acrylonitrile was 11.2%. The pellets were then molded as described above.

The results are set forth in Table 5 below.

TABLE 5

| Sample | Appearance | Viscosity (Kp) | Gel |
|---|---|---|---|
| Moldings Delay | | | |

TABLE 5-continued

| Sample | Appearance | Viscosity (Kp) | Gel |
|---|---|---|---|
| None | Excellent surface glossy | 19.0 | None |
| 5 mins. | Excellent surface glossy 5 blisters (approx.) | 21.7 | None |
| 10 mins. | As for 5 min. 30 blisters (approx.) | 25.7 | None |
| 15 mins. | As for 5 mins. except 50 blisters (approx.) | 29.8 | None |
| 20 mins. | As for 15 mins. with gloss reduction | 34.2 | None |
| 25 mins. | Gloss reduction Getting brown over 50 blisters which are getting bigger | 40.4 | Lumps |
| 30 mins. | Surface dull over 50 big blisters | 42.3 | Lumps |
| 35 mins. | As for 30 mins. worse | 43.2 | Lumps |

The above data indicate that the polymer stability while remaining reasonably good for about 10 minutes thereafter becomes an increasingly significant factor as indicated by the rapid increase in viscosity and the reduced surface quality.

EXAMPLE 6

Example 5 was repeated except that 2% by weight of TCPA was incorporated into the final blend. The results are set forth in Table 6.

TABLE 6

| Sample | Appearance | Viscosity (Kp) | Gels |
|---|---|---|---|
| Moldings Delay | | | |
| None | Good gloss Tan color No blisters | 15.8 17.3 | None None |
| 5 mins. | Good gloss Tan color Blistering begins | | |
| 15 mins. | Reduced gloss Tan color-brownish Severe blistering | 22.8 | None |

Comparison with the data in Table 5 shows a significant improvement in melt flow (viscosity) though not in the blistering tendency. The TCPA is apparently the source of the brown color at the stock temperatures.

EXAMPLE 7

In this Example the base polymer was obtained by pre-extruding a mixture of ABS and 2% (of the ABS weight) of TCPA. This mixture was then extruder blended with S/MA/MM (in a 63/37 weight ratio), Ethanox 330 (0.3%) and Naugard P (0.3%) and molded using the technique described above. The results are set forth in Table 7 below. The TCPA content was 1.26%, the AN content was 11.2%, and the MA content 9.6%.

TABLE 7

| Sample | Appearance | Viscosity (Kp) |
|---|---|---|
| Molding Delay | | |
| None | Good gloss Color tan No blistering | 16.1 |
| 5 mins. | Good gloss Color tan Occasional blister | 17.2 |
| 15 mins. | Reduced gloss Color tan-brown Severe blistering | 21.6 |
| 25 mins. | Reduced gloss Color tan-brown Severe blistering | 29 |

Thus, the performance with 1.26% TCPA is very similar to that with 2% TCPA.

EXAMPLE 8

This Example illustrates the use of tetrabromophthalic anhydride (TBPA) to control crosslinking and decomposition in a polymer formulation.

The formulation used is that of Example 2 except that 1% of TBPA is substituted for the 1.26% of TCPA. The performance of the blend was evaluated in the same manner and the relevant performance of the Example 1 product is reproduced for the sake of comparison. The results are set forth in Table 8.

TABLE 8

Performance of Tetrabromophthalic Anhydride

| Molded Samples Delay Molding | Appearance | | Viscosity | |
|---|---|---|---|---|
| | Ex. 1 | Ex. 8 | Ex. 1 | Ex. 8 |
| 0 | Good surface-Many small internal bubbles | Clear No blisters- Orange | 16 | 14.3 |
| 5 | Frosted surface- due to gas evolution | (as above) | 31 | 14.4 |
| 10 | (as above) | Clear-Few internal bubbles. No blisters. Brown | — | 14.5 |

From the above data it can clearly be seen that the TBPA is very effective at reducing decomposition (as evidenced by the reduction in gas evolution) and crosslinking (as shown by the relatively stable viscosity).

EXAMPLE 9

This Example tests the effect of the additives of the invention on the S/MA/MM terpolymer used as a component of the formulation tested in Example 1.

For this Example the investigation was of the degree to which the additive was able to stabilize the terpolymer against decomposition and thus the variable investigated was the amount of carbon dioxide evolved as a result of the decomposition.

The equipment used comprised a gas chromatograph with a thermal conductivity detector. The gas chromatograph oven is used to heat the sample under test. The sample is placed in a tube and inserted in the oven and the sample loop of the chromatograph is purged in the usual way. The sample is then heated according to a pre-set program. The gas chromatograph produces a pen trace of the carbon dioxide evolved and the area between the trace and the base line is integrated (using a Hewlett-Packard area digitizer) as a function of time. The calibration of milligrams of carbon dioxide per unit area is obtained by pyrolysis of sodium bicarbonate.

Results obtained at 280° C. as a function of (cumulative) time at that temperature are set out below in Table 9. The terpolymer was tested alone and as a blend with varying amounts of TCPA and TBPA.

TABLE 9

| Time (min.) at 280° C. | Terpolymer Alone | (mg. evolved) 1% TCPA | 1% TBPA |
|---|---|---|---|
| 0 | 0 | 0.001 | 0.001 |
| 5 | 0.023 | 0.0250 | 0.017 |
| 10 | 0.137 | 0.090 | 0.045 |
| 15 | 0.285 | 0.172 | 0.094 |
| 20 | 0.497 | 0.0305 | 0.144 |

From the above it can be seen that both TCPA and TBPA have a significant effect on the amount of carbon dioxide evolved at 280° C., with TBPA having the most dramatic effect.

EXAMPLE 10

This Example illustrates the beneficial effect of adding a chain transfer agent to the formulation according to the invention. The polymer formulation was that used in Example 1 (SAN plus S/MA/MM), the anhydride additive was TCPA and the chain transfer agent was gamma-terpinene. The results are set forth in Table 10 below.

TABLE 10
Effect of Chain Transfer Agent

| Sample Molding Delay (mins.) | No Additives Appearance | Visc. Kp | 2% TCPA Appearance | Visc. Kp | 2% TCPA + 2% GT* Appearance | Visc. |
|---|---|---|---|---|---|---|
| 0 | No surface blisters 20 internal blisters | 20.9 | No surface blisters, some internal bubbles, yellow-orange | 11.4 | Good surface, internal bubbles, light yellow | 9.4 |
| 5 | Some surface blisters Many internal blisters | 25.7 | Good surface, more internal bubbles, brownish | 12.2 | (as above) | 9.7 |
| 10 | Badly blistered, bulging, hazy | 55.0 | Good surface, more internal bubbles, getting browner | 14.2 | — | |
| 15 | | | (as for 10) | 14.9 | Good surface, Many internal bubbles, light brown | 9.6 |
| 20 | | | (as for 10) | 14.9 | — | |
| 25 | | | (as for 10) | 15.6 | As for 15 except deeper brown color | 10 |

*GT is gamma-Terpinene

As can be seen from the above the addition of gamma-terpinene markedly improves the color and the viscosity stability.

What is claimed is:

1. A polymer composition of improved stability comprising polymerized units derived from a vinylaromatic monomer, an ethylenically unsaturated anhydride monomer, and an ethylenically unsaturated nitrile monomer and from 0.1% to 8% by weight based on the composition weight of a tetrahalogenated aromatic dicarboxylic acid or anhydride of such an acid.

2. A composition according to claim 1 wherein the aromatic monomer, anhydride monomer and ethylenically unsaturated nitrile monomer units are provided by a styrene/maleic anhydride/acrylonitrile terpolymer.

3. A composition according to claim 1 which comprises in combination (a) a polymer comprising from 45 to 90% by weight of styrene with from 10 to 35% by weight of maleic anhydride and from 0 to 20% by weight of a monomer selected from the group consisting of acrylonitrile and methyl methacrylate and (b) an acrylonitrile/butadiene/styrene polymer.

4. A composition according to claim 1 which comprises in combination (a) a polymer of styrene and maleic anhydride; and (b) a polymer selected from the group consisting of a styrene/acrylonitrile polymers and acrylonitrile/butadiene/styrene polymers.

5. A composition according to any one of claims 1 to 4 in which the halogenated aromatic polycarboxylic acid or anhydride is selected from the group consisting of tetrachlorophthalic anhydride and tetrabromophthalic anhydride.

6. A composition according to claim 1 which contains from 0.5 to 2% by weight of the tetrahalogenated aromatic discarboxylic acid or anhydride of such an acid.

7. A polymer composition of improved stability comprising (a) a polymer comprising a styrene monomer, maleic anhydride and optionally an additional monomer selected from the group consisting of acrylonitrile and methyl methacrylate; (b) a polymer selected from the group consisting of styrene/acrylonitrile polymers and acrylonitrile/butadiene/styrene polymers; and (c) from 0.5% to 2.0% by weight based on the composition weight of a tetrahalogenated aromatic dicarboxylic acid or anhydride of such an acid.

* * * * *